April 1, 1930.  A. KAPPEL  1,753,084
CLOTHESLINE PULLEY
Filed Oct. 31, 1927
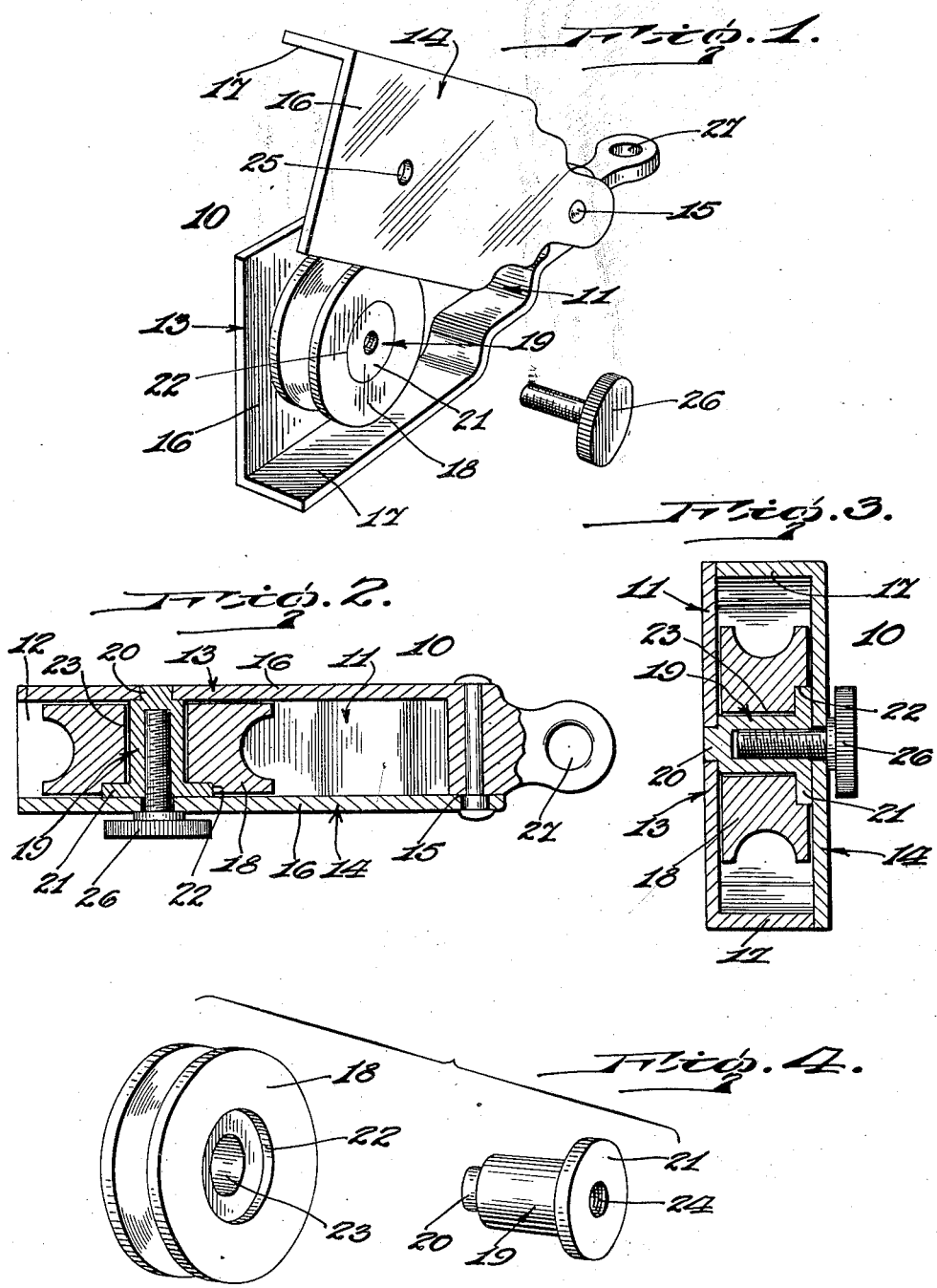
ADOLPH KAPPEL
INVENTOR
BY Victor J. Evans
ATTORNEY
WITNESS:

Patented Apr. 1, 1930

1,753,084

UNITED STATES PATENT OFFICE

ADOLPH KAPPEL, OF BROOKLYN, NEW YORK

CLOTHESLINE PULLEY

Application filed October 31, 1927. Serial No. 230,063.

This invention relates to improvements in clothes line pulleys.

The primary object of the invention resides in a clothes line pulley in which the pulley wheel is enclosed within a casing to protect the same from rust and which casing is so constructed that any obstruction in the clothes line such as knots may freely pass therethrough and which is necessary when it is desired to wipe the entire line clean of any dirt before hanging clothes thereon.

Another object of the invention is to provide a clothes line pulley which includes a pair of separable sections pivotally connected together and which serve as the housing for the pulley wheel, there being a suitable bearing provided on one of the sections upon which the pulley wheel is journalled and into which a removable element extends for locking the two sections in co-acting position.

A further object is to provide a clothes line pulley which is simple in construction, easy to assemble, and inexpensive of manufacture.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved clothes line pulley showing the casing sections in an open position.

Figure 2 is a horizontal sectional view with the casing sections in a closed position.

Figure 3 is a vertical transverse sectional view taken at right angles to the section shown in Figure 2.

Figure 4 is a separated perspective view of the pulley wheel and its bearing.

Referring more particularly to the drawing, the reference numeral 10 designates my improved pulley wheel in its entirety which includes a housing or casing 11, open at one end as at 12. The housing embodies a pair of co-acting sections 13 and 14 which are pivotally connected together as at 15. Each section includes a side wall or plate 16 and an inwardly extendng right angularly disposed flange 17 which co-act to provide opposed walls for housing the pulley wheel 18.

The pulley wheel 18 is supported upon the section 13 by a bearing 19 having a reduced stud 20 which passes through the side plate 16 of the said section and is fixed therein in any suitable manner such as by upsetting the end of the same or by sweating. The bearing has an annular head or flange 21 at the outer end thereof which is countersunk in a recess 22 provided in the outer face of the pulley wheel and which is concentric with respect to the bore 23 therein through which the bearing extends. The bearing has a threaded bore 24 therein with which an opening 25 aligns when the sections 13 and 14 are in a closed position for threadedly receiving the threaded shank of a headed screw or stud 26. By threading the stud into the bearing, the sections 13 and 14 are held against swinging movement.

For attaching the pulley to a hook or nail, I provide an eye 27 on the section 13.

In use, it will be understood that the clothes line passes over the pulley wheel 18 and is free to pass through the casing but in clothes lines having a knot or other obstruction thereon which is too large to pass over the pulley wheel between the walls of the casing, it becomes necessary to separate the sections by unscrewing the stud 26 and swinging the same outward of each other as shown in Figure 1 of the drawing. The clothes line may be disengaged from the pulley wheel to allow the obstruction to pass and may be readily replaced. It may become necessary to gain access to the interior of the casing for cleaning the pulley wheel 18 and this is also accomplished by separating the casing sections as above mentioned.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A clothes line pulley comprising a housing open at one end embodying a pair of co-acting pivotally connected sections, a bearing extending inwardly from one of said sections and having a threaded bore therein, a pulley wheel rotatably mounted on said bearing, the other of said sections having an opening therein for registry with said threaded bore when said sections are in a closed position, and a threaded stud passing through said opening and co-acting with said threaded bore for maintaining said sections in a closed position.

2. A clothes line pulley comprising a housing having an opening therein to receive a clothes line and embodying a pair of co-acting pivotally connected sections, each section consisting of a side plate and an angularly disposed flange, the side plate of each section engaging the angular flange of the other section, a bearing extending inwardly from one of said sections and having a threaded bore therein, a pulley wheel rotatably mounted on said bearing, the other of said sections having an opening therein for registry with said threaded bore when said sections are in a closed position, and a threaded stud passing through said opening and co-acting with said threaded bore for maintaining said sections in a closed position.

3. A clothes line pulley comprising a housing having a side plate with an attaching eye therein, a bearing stud mounted on said plate and having a threaded bore therein, a pulley revolvable on said bearing stud to accommodate a clothes line, a swingable housing plate co-acting with the first plate and having an aperture therein, a threaded stud freely passing through said aperture and threadedly engaging said bore, and a pivot on said first plate whereon said second plate is swingable to open said housing for separation of the clothes line from said clothes line pulley.

In testimony whereof I have affixed my signature.

ADOLPH KAPPEL.